United States Patent
Valeti

(10) Patent No.: US 10,192,201 B1
(45) Date of Patent: Jan. 29, 2019

(54) ELECTRONIC IDEA NOTEBOOK

(71) Applicant: Uma Valeti LLC, Saint Paul, MN (US)

(72) Inventor: Uma S. Valeti, St. Paul, MN (US)

(73) Assignee: Uma Valeti LLC, St. Paul, MN (US)

( * ) Notice: Subject to any disclaimer, the term of this patent is extended or adjusted under 35 U.S.C. 154(b) by 0 days.

(21) Appl. No.: 15/012,408

(22) Filed: Feb. 1, 2016

Related U.S. Application Data

(63) Continuation of application No. 13/341,770, filed on Dec. 30, 2011, now Pat. No. 9,252,962.

(60) Provisional application No. 61/428,651, filed on Dec. 30, 2010.

(51) Int. Cl.
*G06F 15/16* (2006.01)
*G06Q 10/10* (2012.01)
*G06Q 50/18* (2012.01)

(52) U.S. Cl.
CPC ......... *G06Q 10/101* (2013.01); *G06Q 50/184* (2013.01)

(58) Field of Classification Search
USPC ........ 709/205, 201, 203, 217, 202, 218, 219
See application file for complete search history.

(56) References Cited

U.S. PATENT DOCUMENTS

| | | | | | |
|---|---|---|---|---|---|
| 6,161,113 | A * | 12/2000 | Mora | ....................... | G06F 8/20 715/234 |
| 2002/0145742 | A1* | 10/2002 | Koenig | ............. | G06F 17/30017 358/1.1 |
| 2005/0125717 | A1* | 6/2005 | Segal | ..................... | G06F 17/242 715/201 |
| 2005/0227218 | A1* | 10/2005 | Mehta | ...................... | G09B 5/00 434/350 |
| 2008/0195239 | A1* | 8/2008 | Rotholtz | ........... | G06F 17/30749 700/94 |
| 2009/0228387 | A1* | 9/2009 | Johnson | ................. | G06Q 10/10 705/37 |
| 2010/0131327 | A1* | 5/2010 | Hseush | .................. | G06Q 10/00 705/319 |
| 2010/0333194 | A1* | 12/2010 | Ricordi | ............. | G06F 17/30943 726/17 |
| 2011/0107397 | A1* | 5/2011 | Niv | ......................... | G06F 21/64 726/3 |
| 2013/0160102 | A1* | 6/2013 | Decara | .................... | G06F 21/33 726/7 |

* cited by examiner

*Primary Examiner* — Lan Dai T Truong
(74) *Attorney, Agent, or Firm* — Fish & Richardson P.C.

(57) ABSTRACT

A computer-implemented method includes receiving, from a device associated with a user of a hosted computer system, entries in a template of an electronic invention disclosure form; linking the invention disclosure form to at least one portion of an inventor's notebook containing disclosure of an invention addressed by the invention disclosure form; providing invitations to a collaboration space for the invention, whereby acceptance of the invitation provides access to at least a portion of the invention disclosure form; and providing secure access to invitees into the collaboration space, wherein the invitees are determined to have been invited to the particular collaboration space.

19 Claims, 10 Drawing Sheets

ELECTRONIC IDEA NOTEBOOK

CROSS-REFERENCE TO RELATED APPLICATIONS

This application claims priority to U.S. Provisional Application Ser. No. 61/428,651, filed on Dec. 30, 2010, entitled "Electronic Idea Notebook," the entire contents of which are hereby incorporated by reference.

TECHNICAL FIELD

This document relates to systems and techniques for managing electronic idea notebooks.

BACKGROUND

Individuals use various methods of tracking their ideas and related work. One common approach is the use of a bound paper lab notebook. In the context of laboratory research, a lab notebook is a primary record of research. Researchers use a lab notebook to document their hypotheses, experiments, and initial analysis or interpretation of such experiments. The notebook can serve as an organizational tool, a memory aid, and can also have a role in protecting any intellectual property that comes from the research. Lab notebooks have many similar applications in areas outside of strict laboratory research. However, carrying around a bound lab notebook results in many hassles and security issues.

Lab notebooks also appear in electronic form. An electronic lab notebook may act like a standard word processing application that also tracks the dates on which new information was added to the notebook and provides a mechanism for verifying such information. Various organizations use both paper and electronic lab notebooks as mechanisms for documenting work and progress by their technical employees, and to communicate information about inventions and ideas between and among team members.

SUMMARY

This document describes systems and techniques that may be used to manage the recording of, and review of, information in an electronic notebook such as an electronic inventor's notebook. For example, a notebook may be managed by a hosted server system and be accessible over the internet to a variety of users. A main user may be an owner of the notebook, such as an inventor who records new ideas, observations, experimental results, and the like in the notebook. Other user may include a supervisor of the inventor, and one or more patent attorneys who can access the notebook in order to provide the inventor with legal advice regarding his inventions in the notebook. Collaborators of the inventor may also access the notebook, and provide comments on the ideas represented there.

Such various users may be given role-based access rights to the content in the electronic notebook. For example, the inventor may be provided with full access rights so that he can add content, delete content, and otherwise edit content in the notebook (where deletions may be tracked so that previously-present information can be identified even if it no longer appears in a general version of the document). The collaborators may be provided with similar rights, though the inventor may be provided with control over edits made by collaborators, so that the inventor can approve or disapprove of edits by collaborators before they take effect in the notebook. Businesspeople or patent attorneys may be given read-only access to the content, but can be allowed to annotate the notebook, where such annotations will be placed on a layer that is associated with the particular role of the annotating user. For example, an in-house patent attorney at a company and an outside patent attorney at a firm may be allowed to add annotations to the notebook, and the inventor will be able to surface or hide such annotations by selecting an "attorney comments" layer in the notebook. The comments can be assigned to a role based on a sign-in and profile for each user. For example, a particular user may identify their role with the system as being an attorney rather than an inventor, and their access may be controlled according to the attorney role, and their annotations or other comments or edits may be applied to an "attorney" layer, in addition to a layer associated with the particular person (e.g., so that the inventor can see just comments from that particular attorney or from all attorneys).

The content of the notebook may take multiple forms, including as a summarized document that includes multiple hyperlinks to one or more distributed documents (e.g., the hyperlinks may point to other portions of a notebook, to other notebooks, and to external content such as publicly available web pages and other electronic documents). The summarized document may take the form of an invention disclosure form whose format is controlled by a standardized template that an inventor fills out, such as to answer questions about the problem addressed by the invention, the conception of the invention, and the like. The inventor may provide links to related information, including information in the inventor's notebook, such as a link from a question about the date of conception for an invention, to a page in the notebook where the inventor's conception has been established. Links may also be provided from the invention disclosure form to other content sources, such as audio files, video files, or audio/video files that the inventor has recorded of himself explaining the invention verbally. Thus, if an inventor communicates better verbally than in writing, the inventor may decline to type information for one section of the form, and may instead insert an icon that links to a video that the inventor captures, such as using a tablet computer device.

In certain implementations, such systems and technique may provide one or more advantages. For example, inventors may easily track their inventing progress through an electronic inventor's notebook that can be provided with features that make recording information more convenient and powerful. Inventor teams may also collaborate more readily with each other, such as through a hosted computing service that is available to any user with an internet connection. Inventors may also share their information with legal and business personnel, such as by inviting them to share access to an invention disclosure form, and allowing them to comment on or annotate the invention disclosure form and/or the inventor's notebook. In addition, automatic workflows may be implemented that notify various users when they should review invention-related content, such as an inventor inviting his patent attorney to review a disclosure form, and the inventor being notified when the attorney has accessed the form and left comments on the form. Moreover, where the system is an internet-accessible hosted system, such as a "cloud-based" system operated by a third party, users can access the system from any internet-capable location, and users from various different organizations can access their documents if they are properly credentialed, while their organizations do not need to take on the burden of operating, updating, and maintaining such a system. Such a system may operate according to a low-capital business model also, by which users pay a monthly fee rather than having to purchase software and hardware up front. The process of inventing and transferring knowledge to other professionals can thus be much more enjoyable for all users of a system, which may increase the level of inventing and of protecting such inventions, which can benefit inventors, their employers, and intellectual property counsel. Such features may be particularly helpful to novice inventors, in that such inventors may be guided through an invention documenting process, and may have more direct access to asking questions of business or legal counsel via the system.

In one implementation, a computer-implemented method is disclosed that comprises receiving, from a device associated with a user of a hosted computer system, entries in a template of an electronic invention disclosure form; linking the invention disclosure form to at least one portion of an inventor's notebook containing disclosure of an invention addressed by the invention disclosure form; providing invitations to a collaboration space for the invention, whereby acceptance of the invitation provides access to at least a portion of the invention disclosure form; and providing secure access to invitees into the collaboration space, wherein the invitees are determined to have been invited to the particular collaboration space.

The computer-implemented method of claim 1, wherein the template includes questions about content and process for an invention, and the entries comprises answers to the questions. The received entries can identify pointers to content about an invention, the content located outside the invention disclosure form, and linking the invention disclosure form to at least one portion of the inventor's notebook can comprise storing, with the hosted computer system, a uniform resource indicator that is associated with the invention disclosure form and points to the at least one portion of the inventor's notebook. The method can also include controlling user access to content from the invention disclosure form or the inventor's notebook to users identified by an owner of the invention disclosure form.

In some aspects, controlling user access comprises identifying a working role of a user attempting to access content, and using the identified role to determine an ability of the user to access the content. Also, the entries can include data selected from two or more categories consisting of digital video, digital audio, digital audio/video, digital images, electronic drawings, and text. The method can also comprise time-stamping or geo-stamping content in the inventor's notebook to indicate when or where the content was provided to the inventor's notebook, the inventor's notebook having multiple different time or geo stamps for different sub-sets of content in the inventor's notebook.

In other aspects, the inventor's notebook is associated with a defined project having a common developmental focus, and the hosted computer system stores other separate inventor's notebooks associated with other defined projects that have other developmental focuses. Also, the hosted computer systems can associate a plurality of separate invention disclosure forms with a particular inventor's notebook that is accessible by multiple inventors and that contains content from portions of inventor's notebooks that are not accessible to each of the multiple inventors. And in other instances, the method further comprises identifying potential inventors based on content provided in the inventor's notebook, users who have access to the inventor's notebook, or both.

In another implementation, a computer-implemented system is disclosed. The system comprises an internet-connected electronic interface connected to receiving, from a remote computing device, entries in a template of an electronic invention disclosure form; a notebook manager programmed to link the invention disclosure form to at least one portion of an inventor's notebook containing disclosure of an invention addressed by the invention disclosure form; and an access controller programmed to provide, in response to identifications of users by a user associated with the invention disclosure form, invitations to a collaboration space for the invention, and to provide secure access to invitees into the collaboration space, wherein the invitees are determined to have been invited to the particular collaboration space. The template can include questions about content for an invention, and the entries comprises answers to the questions. Also, the received entries can identify pointers to content about the invention, the content located outside the invention disclosure form.

In one or more aspects, links from the invention disclosure form to at least one portion of the inventor's notebook comprise one or more uniform resource indicators that are stored and are associated with the invention disclosure form, and that point to the at least one portion of the inventor's notebook. Moreover, the access controller can further control user access to content form the invention disclosure form or the inventor's notebook to users who have been identified by an owner of the invention disclosure form. And controlling user access can comprise identifying a working role of a user attempting to access content, and using the identified role to determine an ability of the user to access the content. In addition, the system can also include a workflow module programmed to notify a second user upon identifying that a first user has performed an action with respect to the a project associated with the invention disclosure form, the action identified as requiring attention by the second user.

In yet another implementation, a computer-implemented system is disclosed that includes an internet-connected electronic interface connected to receiving, from a remote computing device, entries in a template of an electronic invention disclosure form; a notebook manager programmed to link the invention disclosure form to at least one portion of an inventor's notebook containing disclosure of an invention addressed by the invention disclosure form; and means for controlling access to the invention disclosure form according to invitations made by one or more existing users who currently have access to the invention disclosure form.

The details of one or more embodiments are set forth in the accompanying drawings and the description below. Other features and advantages will be apparent from the description and drawings, and from the claims.

DETAILED DESCRIPTION

This document describes systems and techniques for recording, tracking, and sharing information about ideas and inventive activity in a collaborative and secure manner. As described below, a hosted server system may make available to an inventor (which may include multiple people on an inventive team) and others working with the inventor, multiple work areas in the form of inventor notebooks and invention disclosure forms, and tools for managing content in such work areas. An inventor may use the system on an ongoing basis to record ideas, results of experiments, and other information that is traditionally recorded in an inventor's notebook. The inventor entries may all be time-stamped so that the time and circumstances of the invention can later be confirmed. Entries may also be geo-coded so that the location at which particular ideas were formed may be tracked.

Portions of the inventor notebook may also be associated with particular invention disclosure forms that an inventor fills out. Such forms may start as a familiar template that asks the inventor to identify points such as the problem addressed by the invention, the date the invention was conceived, and the description of various embodiments of the invention. The inventor may type responses into the form and may also provide links, at locations of particular responses, to content external to the invention disclosure form, including links to particular parts of the inventor notebook (e.g., a page of the book at which conception of the invention is shown) and to additional content, such as links to identified prior art on the internet, to videos that the inventor has recorded of the invention operating (e.g., as a real physical invention or as screen shots of an executing piece of software that displays a user interface), and the like.

Such information may also be electronically annotated by other users, such as supervisors and patent attorneys. For example, an inventor may invite his patent attorney to review an invention disclosure form, and the attorney may leave annotated questions in line with the form, where the disclosure is unclear and the attorney needs additional information from the inventor. By being invited to the form, the attorney may also be granted access to the relevant portions of the inventor notebook that are linked to form the form. An inventor may assign particular pages, sections, or other portions of their inventor notebook to particular inventions, and access restrictions may be applied on a per-invention manner.

Figure 1:
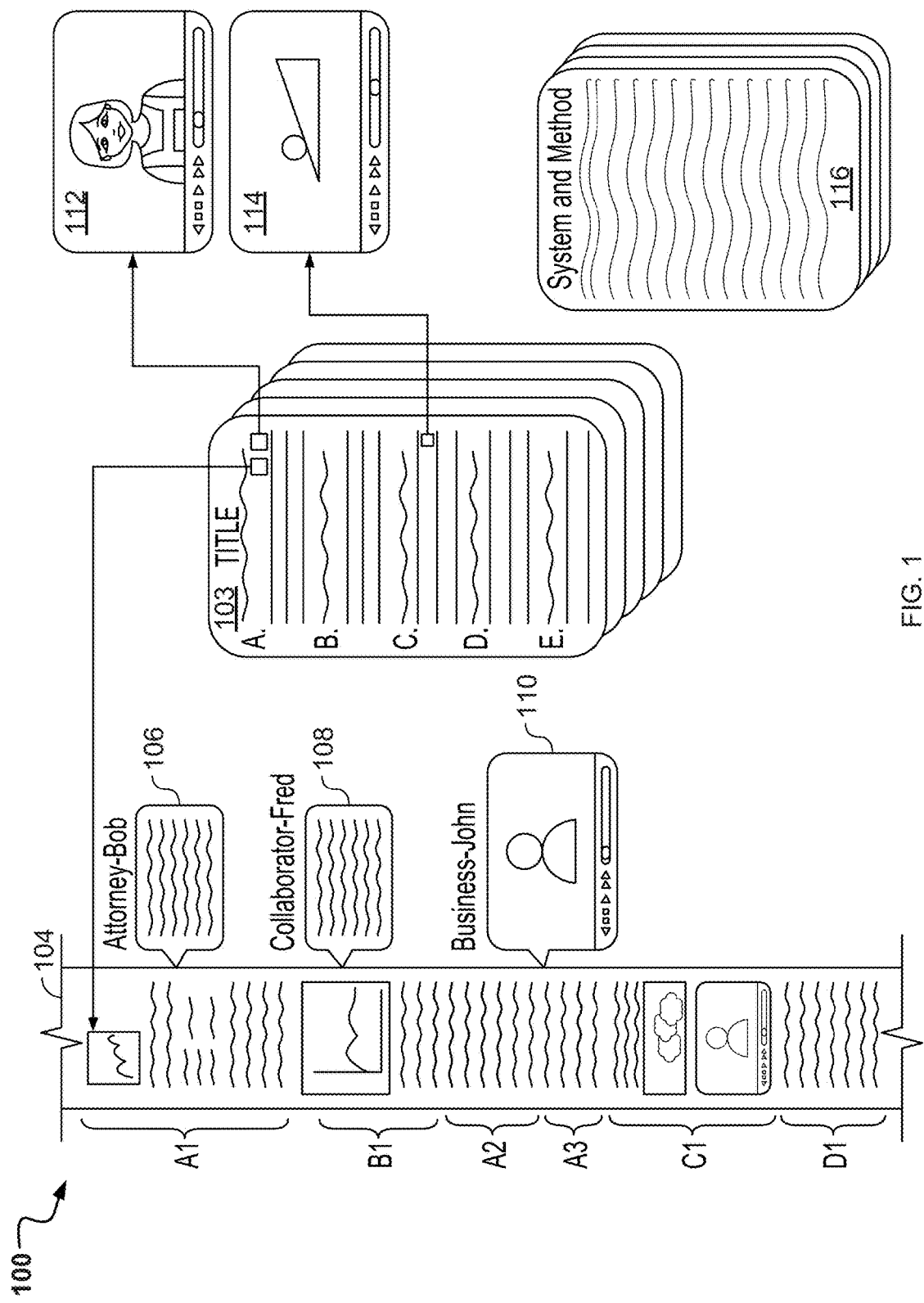
FIG. 1 is a conceptual diagram of an invention recording system.

FIG. 1 is a conceptual diagram of an invention recording system 100. In general, the system 100 centers around an inventor's notebook 104 and an invention disclosure for 104 for a particular invention within the inventor's notebook 104. Various components in the figure show example functionality that the system 100 may provide with respect to those two items, and the manner in which the items interact with each other.

Referring now more particularly to components in the system, the inventor's notebook 104 is shown as a portion of a continuous strip of content. This representation is intended to indicate how an inventor may add content to the inventor notebook chronologically, by first working on one invention, and then moving to another. The straight chronological order shown here is more representative of a classic paper-based notebook and may be so represented in an electronic notebook, though the representation may be more directed to particular inventions. For example, entries A1, A2, and A3 are all directed to invention A, and they may be shown to a user in chronological order, without the intervening entry for B1, which relates to a separate invention B. The association of particular entries to particular inventions may occur by an inventor or other user of the system 100 marking the start and end points for an entry, and then selecting a title of the invention to which the entry pertains, such as from a drop-down list of inventions. Initially, entries may not be associated with any invention, since an inventor will just be taking notes as new ideas come to him, but the inventor may later identify a name for an invention and link portions of the notebook 104 to them.

The links between notebook 104 entries and inventions may be many-to-many in form. Specifically, a single entry may link to multiple different inventions that an inventor has identified to the system 102. For example, an inventor may develop a component that is itself an invention, but it may also be used as a piece in a number of different machines that are separate inventions. In such a situation, pages in the notebook 104 that describe the component may be identified as being part of the particular inventions as well. Such links may be made up of text in a document that describes the overall invention, or as clickable portions of figures that show components of the inventions, so that when a user clicks on a portion of an invention that is shown in a drawing, content for the component at that location in the drawing may be shown (e.g., in a pop-up window that displays text about the component or pages form the notebook where the component's operation is discussed).

Referring now to the invention disclosure form 102, there are shown multiple forms—each for a distinct invention that the inventor has identified in his work. The invention disclosure form 102 may be modeled after standard paper-based invention disclosure forms, and may initially be populated from a template that lists a number of topics to be addressed by an inventor in summarizing the inventor's particular invention. Such topics generally include a title for the invention, what the inventor was doing when he conceived of the invention, a description of the problem that inventor faced that is solved by the invention, a description of the invention generally and of particular embodiments that the inventor has developed, a list and discussion of any prior art of which the inventor may be aware, and basic background data such as the approximate date the invention was conceived and whether any events have occurred or are about to occur that would prevent patenting of the invention (such as public disclosures or sales of embodiments of the invention).

Each sub-section of the template is labeled in this example with an alphabetic character, and followed by a question for the inventor (shown as a squiggly line) and by open lines where the inventor may type an answer. Example representations of an invention disclosure form, both empty and partially complete, are shown in FIGS. 5C-5E and 5G-5J below. In this example, displayed selectable icons are shown in the invention disclosure form 102, at locations where they were placed by the inventor (which again may be one or more individuals). One such icon connects via arrow to the notebook 104, indicating that a user selection of the icon will cause that portion of the notebook 104 to be displayed to the user. In this example, the invention disclosure form 102 relates to invention A, and the top sub-section (A) might request a date of conception from the inventor, so that the inventor has linked to the first entry in the notebook for invention A, which shows actual conception of the invention. Such linking in the invention disclosure form 102 by the inventor may also served as implicit authority for anyone who has access to the invention disclosure form 102 to see the A1 portion of the notebook 102 or all invention A-related portions (A1, A2, and A3), so that a user's authentication to get into the invention disclosure form 102 acts as authentication to see anything linked from invention disclosure form 102. In other embodiments, such accessibility may be a default, and an inventor may interact with the user interface to override the default, e.g., to specify that certain individual invited users or certain users identified as having a particular role (e.g., potential outside investors) should not have access to the notebook 104.

The system 100 may also track who has been given access to content for a project, and who has actually accessed the content. For example, the system 100 can keep an access log and time stamp every accessing event by a user, so that a list of all accesses of the content, and the user who made such access, can be reviewed. Separately, a log may be maintained of people or organizations who have been provided information about an idea or invention, such as by providing a manual log that an inventor may add entries to upon disclosing information to a third party. The log entries may include information that identifies the third party, that identifies the date of the disclosure, and that describes what was disclosed or discussed.

Other content is linked from the invention disclosure form 102 but is not part of the notebook 104. For example, two videos 112 and 114 are the targets of selectable icons on the invention disclosure form 102 and will be played if a user selects the icons. Such videos may have been prepared by the inventor as part of preparing the invention disclosure form 102, separately from preparing the notebook 104—i.e., while the notebook is made for memorializing the inventive process, the invention disclosure form 102 is centered more on the inventor communicating aspects of the invention, and thus may need different types of content. In this example, video 112 is a video of the inventor that the inventor recorded live while filling out the invention disclosure form 102. For example, the inventor may not have been comfortable typing answers and thus may have captured video of himself verbally describing the relevant pieces of information requested by the invention disclosure form 102, e.g., using a camera built into a tablet computer that the user is employing to fill out the form, and the system 100 may automatically store that video in association with the particular invention disclosure form 102.

Video 114 may have been taken by the inventor using a camera on the back side of the tablet computer, where the inventor may have captured the operation of an actual embodiment of the invention such as taking screen shots of a software invention in operation or of a physical machine in motion, potentially with accompanying narration and explanation from the inventor. With such a video, others, such as a patent attorney and businesspeople, can better understand the invention and can also grab screen shots of frozen frames of the video, such as for use as figures in a patent application 116.

Various annotations 106, 108, 110 are also shown in association with the notebook 104. In this example, three different people who the inventor invited to the invention disclosure form 102 or other invention disclosure forms have provided notes in particular locations of the notebook 104. The same users may have provided the same types of annotations to the notebook 104. The same type of annotations may also be made by those users in the invention disclosure form 102. Also, certain commentators may have been invited directly to the particular sub-sections of the notebook 104 without being given access to the invention disclosure form 102, such as collaborators who the inventor wants to provide technical comments on the invention, but who do not need to, and perhaps should not, have access to a potentially privileged communication with legal counsel.

In the examples shown here, a user named Bob having the role of attorney has made annotation 106 to invention A, at sub-section A1. An example annotation might be a question by the attorney asking for additional detail or clarification about something stated in the notebook 102. The attorney may have left the annotation after reviewing the text and figure shown in the notebook 104, and determining that additional information was needed in order to fully describe the invention in a patent application 116.

Annotation 108 has been made by a collaborator of the inventor, whose name is Fred. Again, the role and the identity of the commentator is relevant and is tracked by the system. In this example, Fred may be someone having a similar technical background to that of the inventor, or may be someone who has a complementary background, such as when the inventor is a mechanical engineer, and the invention has aspects of mechanical engineering and electrical engineering to it. The annotation 108 may be an answer by Fred to a particular question about an electrical question the inventor had, or may be any other sort of technical comment that Fred felt the inventor should hear.

Annotation 110 comes from user named John, whose role in the system is that of businessperson, at least with respect to invention A. (John might have the role of collaborator for other inventions.) In this instance, the annotation might be technical, but could also apply to a business aspect of the invention, such as by identifying a marketing opportunity presented by a particular feature of the invention (e.g., a marketing consultant could identify a market need for a solution provided by the invention, and the inventor may respond to such identification by devoting additional time to developing that feature in more detail), or suggesting that a feature be removed from the product if possible because of cost considerations. As can be expected, the types of comments from each of the three additional users may overlaps substantially with each other, since each such other user may have a variety of experiences, and may not be simply pigeon-holed as an attorney, a co-inventor, or a businessperson.

The various annotations may be filtered for viewing and review by user ID or by role. For example, an inventor may be presented with a list of roles, and may choose to check a box only for patent attorneys. The inventor may then scroll through the documentation for invention A (e.g., the invention disclosure form 102 and the notebook 104) and see only comments from attorney Bob (and others identified as having an "attorney" role). Similarly, attorney Bob can scroll through to see only comments by the inventor and any collaborators, so that the attorney can, e.g., make determinations about which collaborators should be named as co-inventors on a patent application 116 based on their contributions that can be discerned from the "paper trail" in the notebook 104. An automatic feature may also make comparisons between language in the claims and specification of a patent application, and in the text of the notebook 104 and annotations made to the notebook, so as to provide guidance in the naming of inventors, particularly with respect to certain claims of the patent application. For example, if a particular term appears in a claim, is not a common English term, and also appears in the system 100 only in an annotation from collaborator Fred, the system may make such a determination for a patent attorney, and place a link next to the particular patent claim that takes the attorney to the annotation by Fred, so that the attorney can confirm whether the annotation from Fred was related to the claimed feature, was the source of the feature, and was of such character that Fred should be considered a co-inventor for the claimed subject matter.

As another feature, the system may initially suggest possible co-inventors to legal counsel based, for example, on the textual analysis described above, and also by presuming that users having a particular defined role with respect to a project or collaboration space will be named as provisional co-inventors. For example, all users who have been provided read and write access to the collaboration space may be suggested to legal counsel as potential co-invnetors.

The techniques shown here may be employed by a variety of users. As one example, a hosting service may provide access to private areas like those described here, as an extension on a service like GOOGLE DOCS AND SPREADSHEETS. MICROSOFT SHAREPOINT. or MICROSOFT 365, and inventors may register to use such a system to manage their documentation process. The inventors may pay a fee or may instead choose to have advertising displayed to them in lieu of paying a fee (where the advertising may be targeted to the particular needs of inventors and to the type of technology exhibited by a particular invention, as determined by an analysis of text in the invention disclosure form or notebook for the invention). Alternatively, a company may subscribe to such a service or purchase software and host such a service on its servers, for use by its engineers and other creative staff, and for access by patent counsel who work to file patent applications 116 for it (whether outside or in-house) and businesspeople who may be involved in reviewing such work, such as engineering directors and others who might be members of invention review committees. Outside law firms may also subscribe to a hosted service run by a central third party organization, and may make such a service available to their clients, either for a fee, as a free bonus, and/or as a mechanism to improve the quality of content that their clients provide to them and to thereby make their jobs easier and to improve the quality of the patent applications 116 they file and prices at which they can file the applications 116.

Thus, using the techniques described here, the system 100 can provide mechanisms for an inventor (singular or a team) to track their creative thought process and to summarize their inventions that are made as part of that thought process, such as in the form of an invention disclosure form that can be reviewed by patent counsel and others who need to make a decision about whether to seek intellectual property protection for a particular invention. The inventor can control access to such information, such as by defining the levels of access for people having particular work-based roles, granting levels of access to the particular roles, and then inviting other users to review the content while assigning roles to such users. Those other users can annotate or otherwise edit the content, and each of the users may variously review the content initially provided, and as edited. Moreover, where the process leads to a patent application 116, the application 116 too, in its draft form, may be made accessible via the system 100 so that, just as the patent attorney could easily comment on the disclosure materials, the inventor may comment on the patent application.

Although the notebook 104 is shown for illustration in a traditional form of a number of chronologically-formed ideas and notes in a flow, the organization of the notebook may also be more topically-based. In particular, users may establish a number of collaborative "rooms," where each room is associated with a project or idea. For ideas that are too nascent to have such an association, the information may be kept in a general room for a particular inventor, similar to notetaking in a personal paper-based inventor's notebook. Other content may be added and edited in particular other rooms, and access to each room may be controlled independently—e.g., providing access to members of a development team (i.e., prospective co-inventors) initially, and then adding access for others, including legal counsel and businesspeople. In this manner, development teams can work together easily and have all of their development notes and data in an easy-to-locate place for each project. And others can be allowed to see all such information (though perhaps with read-only access) so that they can more fully understand the development process in a way that might not be possible if the inventors simply provided these others with an invention disclosure form and some figures.

Figure 2:
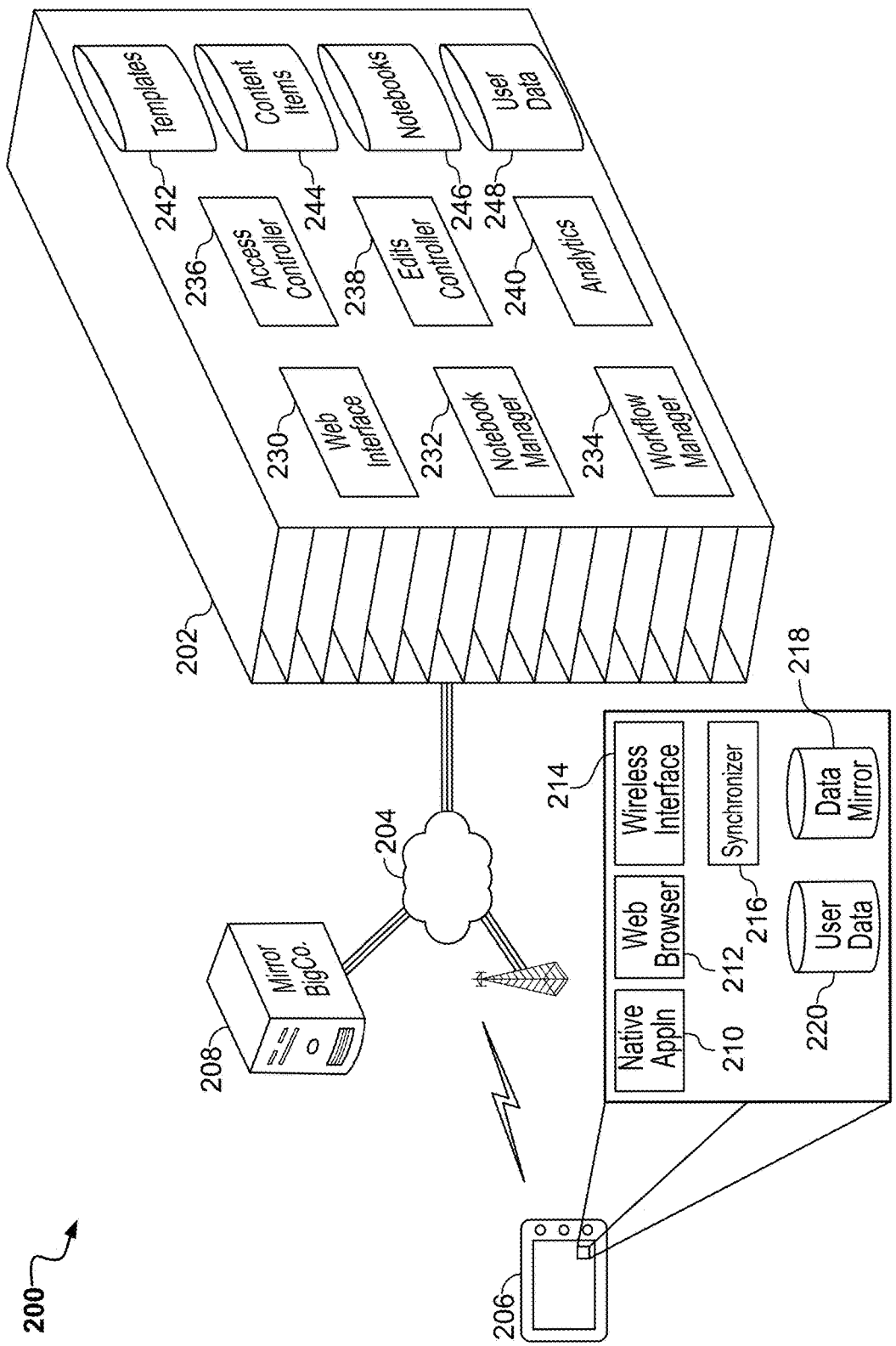
FIG. 2 is a block diagram of a computer-implemented system for managing invention-related information.

FIG. 2 is a block diagram of a computer-implemented system 200 for managing invention-related information. In general, the system 200 includes a hosted service that executes on a server system 202 in coordination with a native application executing on a variety of devices such as a computer tablet 206. The service manages access to invention-related information, including inventor notebooks for tracking an inventor's ideas over time, invention disclosure forms for communicating particular inventive ideas by the inventor to other users such as the inventor's patent counsel, and patent application documents (a written specification and related figures) prepared by patent counsel for filing with appropriate patent offices.

Starting with the tablet 206 (which may take a variety of computing forms, including a desktop computer, laptop, smartphone, and other such devices), a number of components are shown for providing convenient interaction by a user such as an inventor, patent counsel, supervisor, or collaborator, with the overall system 200 and server system 202. In this example, certain particular relevant components are shown for purpose of explanation, but the tablet 206 would typically have a variety of additional components, including an operating system, various applications, and the like.

A first component is a web browser 212, which itself may be used to interact with a web-based invention management system provided by a web server sub-system that is part of the server system 202. Other functions and applications may also be provided by the browser via known techniques. Improved interaction, including a more task-specific user interface, may be provided by the user of a native application 210 on the tablet 206. The native application 210 may be directed specifically at receiving inventor input that describes technical developments made by the inventor (though it may do so across a large number of different inventors, each with their own accounts and own identified inventions). Example user interface screens for the native application are shown in FIGS. 5C-5E and 5A-5K below.

A wireless interface permits the tablet 214 to communicate from a variety of locations with the server system 202 over a network 204 such as the internet. The wireless interface may take a familiar form, such as a WiFi interface, 3G or 4G cellular data interface, or other such relevant form. The native application 210 and web browser 212 may each make requests through the wireless interface 214 of hosted services such as those provided by the server system 202, and may receive information in return via the wireless interface 214.

A synchronizer 216 interacts with the native application 210 to identify changes in content that a user has made with the tablet 206 and to keep an updated version of the content on the tablet 206, e.g., so that a user can review and make edits to content even when the user is not on-line. The synchronizer 216 may have a corresponding counterpart of the server system 202 so that any such off-line changes are reflected in a copy of an inventor notebook and other documents stored in both locations. For example, if two users make near simultaneous changes to a document, the server system 202 or both the server system 202 and the tablet 206 may apply heuristic rules to resolve conflicting edits (such as if one user edits some text while another user deletes the text). The synchronizer can also keep track even of content that has been removed, and can associate all content, whether removed or still in the documents, with a time stamp that reflects when the content was first added and when it was removed (if it has been removed). Time stamping can occur on either or both of a client and a server system 202, such as where server-side time stamping is considered more reliable and thus approved by an appropriate certifying entity. Where there is a conflict, appropriate conflict-resolution techniques may be used, including by preferring the server-side stamp, but storing both stamps and making them available for later inspection.

Various data stores may store and manage information that is relevant to providing users with data about inventions and related developments. For example, a data mirror 218 stores inventor notes from inventor notebooks and invention disclosure forms, and is managed to reflect corresponding data stores on the server system 202 (described below). The user data 220 stores data that defines aspects of particular users. For example, the user data 220 may include information from a profile of the user of the tablet 206 that identifies the preferences of the user in user interface options, verification or credentialing information for the user (e.g., user name and password), and the like.

A corporate mirror server system 208 is shown communicating with the tablet 206 and/or server system 202 via the network 204, for situations in which a large organization such as a corporation that has many inventors and many patent filings, may trust a third-party with the management of such interactions but may want to keep a mirrored copy of the invention-related information to ensure that it does not lose access to the information, even if the server system 202 should become inaccessible for some reason.

The central management of the invention-related information, though, is performed in this example by server system 202, which is shown as a rack server system to indicate that the server system 202 will typically involve a large-scale computing implementation, such as that which can be provided by virtualized serving systems at a major data communications provider such as GOOGLE or AMAZON. The server system 202 may be managed by a third-party that makes its services available to registered members who may or may not be charged a fee. Alternatively, the server system 202 may be operating by a single organization that provides access only for inventors who are employees of, or otherwise inventing for, the organization.

Referring now to particular components of the server system 202, a web interface 230 communicates with applications such as the web browser 212 and the native application 210, among others. The web interface 230 may call to other components of the system to obtain relevant information, and may package the retrieved information into a form that cam be provided for use by the components of the tablet 206 or other such user computing devices.

A notebook manager 232 controls what content is shown in an inventor notebook, an invention disclosure form, or other documents or other pieces of content in the system designed to record inventors' invention-related information. The notebook manager may include a time-stamp module that records dates and/or times when edits are made to a notebook, and may also keep track of revisions made to the notebooks over time, in coordination with the edits controller 238. The edits controller 238 may also place limits on the type of edits that particular users or classes of users (where the classes are labeled based on roles of the users) can make, such as by limiting edits directly in a notebook to inventors, and allowing others merely to annotate the notebooks. The access controller 236 may impose such limitations in combination with the edits controller 238 and notebook manager 232, and may also more generally control access to private information in the system 202. For example, the access controller 236 may require users to provide credentials when they log in (though the credentials may be saved in cookies or other similar mechanisms so that a user need not log in every time they use the system 202), and may check such credentials against a list of authorized credentials, so as to assign a role to each user, and otherwise assign permissions for accessing particular content in the system 202. For example, the access controller 236 may track the e-mail addresses or other credentials of users who have been invited by the owners of particular inventions, into "collaboration rooms" for such inventions, and may otherwise not let anyone see information about the particular inventions.

In certain embodiments, the access controller 236 may also communicate with the device 206 so as to remove mirrored copies of information on the device 206. For example, if a device is lost, a user of the device may report such a loss and the access controller 236 may work through the web interface 230 to contact the native application 210, which may in turn have control over the storage of data in the data mirror 218 and may cause such data to be wiped remotely, where such wiping may occur independently of other mechanisms for removing data remotely that may be on the device 206 and implemented as part of an operating system for the device 206. The system 200 may also be arranged so that any new information that is on the device 206 and not on system 202 (e.g., recent off-line edits by an inventor) can be mirrored back to server system 202 before the wiping of data on device 206 occurs.

The access controller 236 and device 206, or other components may also implement encryption of all invention-related data. For example, team members may be provided a private key for a project, and their respective devices may encrypt information that they added to a project, and the server system 202 may operate on encrypted data when tying together the various document components of a project. Alternatively, or in addition, the server system 202 can decrypt information from each such device, decrypt stored invention-related information from content items 244 and notebooks 246, make edits to such information (e.g., by adding new content from one of the users), and can then encrypt the data for storage so that the data cannot be accessed by unauthorized personnel. Other key management and encryption techniques may also be used, as may efforts to prevent intermingling of data form one organization with that for another organization, where the system 202 is operated by a third-party organization.

A workflow manager 234 controls messaging that is triggered off of user interaction with content managed by the server system 202. For example, the workflow manager may, upon an inventor identifying a patent attorney as being invited to the documents for a particular invention, identify if the patent attorney indicates that the invention disclosure form seems complete, that it would be approved for moving forward if additional information were added, that substantial information needs to be added to the invention disclosure form, or that the submissions will not be accepted (e.g., because the same or similar idea has previously been submitted by someone in the company, or is in the prior art). Upon the patent attorney (or other appropriate user) making such an indication, a message may be sent to the inventor along with a link back to the document, so that the inventor may correct any problems or otherwise comment back to the other user. Upon the inventor submitting such comments, a message may be sent to the other user, so they can further review the inventor's work. Such workflow may continue until the other user approves or finally rejects the submission. A similar workflow may be managed by the workflow manager 234 with respect to draft patent applications, and inventor comments and edits submitted to the same.

For patent application preparation, other components (not shown) may automatically cause a patent application or other similar filing to be made electronically with an appropriate patent office. For example, once the inventor has signed off on the draft documents, the patent attorney can select to have formal documents generated for the inventor, and the system 202 may access meta data about the inventors (e.g., place of residence, citizenship, and the like) to automatically complete such documentation and send messages to each of the inventors to have them complete the documentation. When the documents are signed (e.g., by e-signing or by physical signing with scanning), the patent attorney may select to file, and a script may be executed to interact with the web interface (API) of the relevant patent office, to attach the relevant files (e.g., PDF of specification and figures), and the like, and the payment of necessary fees.

Separately, an analytics module 240 may provide users with reports regarding the operation of the system 202 with respect to their inventions. For example, reports may be generated to identify a total number of invention disclosure forms submitted by inventors for an organization, the number approved, and the number that lead to a patent application being filed. Also, figures for particular cases and statistics for groups of cases may be generated, such as to indicate the amount of time each case (or the average case, with standard deviations) spends awaiting approval, awaiting drafting of a patent application, and awaiting filing. Summary reports may be prepared by the analytics module for managers of an intellectual property group (e.g., in-house legal counsel) that may show relevant information for particular individual cases, aggregated and per-case data for sub-groups of cases (e.g., all cases for a particular inventor, all cases by a particular law firm, or all cases for a particular research or engineering group), and for overall units (all cases for a particular company). The analytics information may also be filtered by date (e.g., all invention disclosure forms received between date X and date Y, or all applications filed between date X and date Y). Such reports may show the time that was spent by inventors preparing invention disclosure forms for cases, the time and dollars spent (or billed) by prosecution counsel, the number of ideas generated by each inventor during a defined period, the number of disclosures submitted and number accepted (and acceptance rate) for a defined period for particular inventors or groups of inventors (e.g., particular departments), the level to which different inventors appear as co-inventors with other employees and the levels to which they appear on projects with employees in other departments, so as to more readily identify employees who collaborate in a more distant fashion, so as to use their experiences to train other employees.

The analytics module 240 may also provide reports regarding the stage at which particular ideas appear in a process of developing them into intellectual property. For example, particular users may be given UI components by which they can identify the progress, and the system 202 may then report the progress to a manager according (e.g., as a percentage of completion of a particular stage). The progress may also be inferred. For example, the progress of a patent application can be inferred by checking its length, checking the amount of time or billed money or hours an attorney has spent on it, or identifying communications (e.g., via email) that have taken place with respect to the application, such as the presence of an email from patent counsel to an inventor attaching a draft indicating that the draft is substantially complete. Such determinations may also allow a report to be generated for a defined group of cases that identify what stage in the process they are at—e.g., preinvention disclosure form, in drafting, filed provisionally, and filed as a utility.

Analytics reports may indicate how effective particular inventors are, such as by indicating how many completed projects they have and how many pending projects (and how long they have been pending). Managers could use such information to identify unproductive employees and intervene at an earlier time than might otherwise be possible.

The analytics module 240 may also perform other analysis, such as by reviewing the text of patent claims, and comparing that text to text in inventor notebooks, to determine which contributors might be in need of naming as co-inventors for contributing the ideas that are in certain claims.

Various data stores in the server system 202 may store and provide data to the components already discussed. For example, a templates database 242 may store templates for various documents that are generated by the system, such as inventor notebooks and invention disclosure forms. Particular organizations can form their own templates, including by providing descriptive text followed by spacing in which users can add content in the form of text, images, videos, links to web sites and other content that may be specified by a URI, and the like.

A content items database 244 stores actual content, such as videos made by inventors to accompany invention disclosure forms, annotations provided by reviewers, answers by inventors to questions from the various stored templates, and similar such items. The items may take a variety of forms, including video, text, images, rich media, and similar formats. The items can also include video recordings of brainstorming sessions that were not initially linked to a project or invention, but were subsequently linked after someone determined that an idea surfaced at such a meeting corresponds to an invention disclosure form or other appropriate identifier of a particular invention.

A notebooks database 246 stores information that defines particular inventor notebooks, including text, graphs, and similar information provided by inventors and that describes their technical work, experiments, and inventions. As noted above, each piece of such notebook content may be date stamped and geo stamped to indicate when it was provided and where the inventor was when he provided it.

User data 248 may reflect user data 220 stored on tablet 206, but may be an aggregation of data for all the users registered with the server system 202. For example, the relationships between users may be stored (e.g., inventor-attorney relationships, inventor-supervisor relationships, and the like). The user data 248 may also include credentials and ID's for each user, contact information (e.g., email) so that appropriate messages may be sent to each such user, preferences for the manner in which information is presented to the user, and other information that defines how the system 202 interacts with each particular registered user when the user provides his credentials.

By these mechanisms, then, the system 200 may provide access by inventors to electronic tools for recording their ideas as those ideas develop, and to communicate their inventions to others, such as patent counsel and businesspeople. The server system 202 may enforce security toward the accessing of invention-related content and toward the ability to edit such content. Moreover, the system 200 may provide for automated workflow between users, so that a user can invite another user to make edits or comments on one or more documents (e.g., to a notebook or invention disclosure form, or to a patent application draft), and the system can notify the non-commenting user when the commenting user has made edits or other comments. As a result, a tightly-integrated environment can be created for the collaboration between inventors and those who support them, and improved technology transfer may occur in the system 200.

Figure 3:
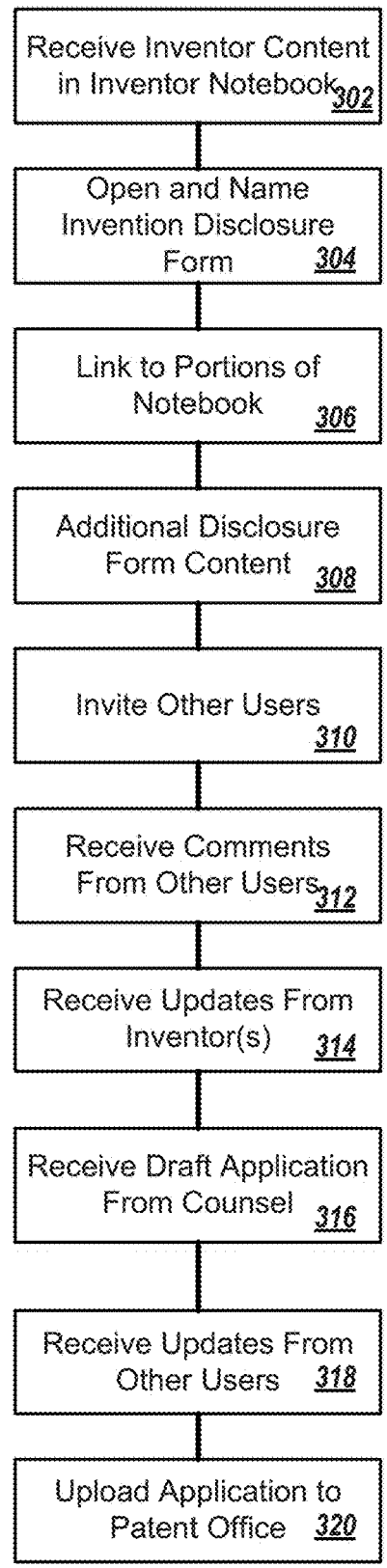
FIG. 3 is a flow chart of an example process for sharing information about inventive activity.

FIG. 3 is a flow chart of an example process for sharing information about inventive activity. In general, the process involves actions by which an inventor (or team of inventors) can track their activities via an on-line electronic notebook, and can then communicate their inventions to one or more other users in a secure manner. Those other users can provide feedback, and the inventors may refine their descriptions in response to such input. One of the other users may then prepare a draft patent application by looking at the inventors' refined description, the inventors may provide feedback to the patent-preparing user, and the application can be uploaded electronically directly from the system that managed the interaction between and among the users.

The process, in this example, starts at action 302, where the process receives inventor content in one or more inventor notebooks. Such notebooks may be organized around particular development projects, and may be collaborate in that multiple different inventors may edit the notebooks, such as using a hosted application similar to GOOGLE DOCS AND SPREADSHEETS. The edits may be tracked, both in terms of what inventor made them and the time at which they were made, but also the geographic location at which they were made. Deleted text and other deleted content may also be tracked and made available so that it can be recovered to determine later who removed certain features from a project, or who had originally made a suggestion that then was removed and replaced with another suggestion.

Such interaction by inventors may be loosely joined and non-directed. Specifically, the inventors have not made an invention yet when much of the work is done, so the notebook may simply serve as a place for the inventors to document their efforts on their way to coming up with a technical solution to a problem.

At box 304, the inventors' work reaches a point at which they can determine that they have made a technical development to an invention, that might be of real value, and thus worth seeking patent protection over. Such an event may occur a number of different times with the inventors during the development of a large project, as they determine that they have developed multiple discrete inventions. At such a stage, they open a document for an invention disclosure form, and name the invention disclosure form. Such an action may further cause a number of bookkeeping transactions to occur in a system, such as the generation of an invention ID number that the system can use to track the progress of an invention through a review process, and other similar information, including information that may be provided by the inventor when opening the invention disclosure form, such as a list of names of the inventor or inventors that, as an initial matter, should be listed as co-inventors for the invention.

At box 306, the process links to portions of the notebook. Such linking may occur automatically based on the inventors previously identifying particular portions of the notebook as being related to a particular feature or project, and then identifying the particular invention disclosure form that they opened as being the result of the feature or project—at which point all portions of the notebook marked as being associated with the feature or project will be jointed and linked to the invention disclosure form. Such linking may also occur manually, such as by one of the inventors selecting a command to provide a link in the invention disclosure form document, and then browsing the notebook to mark portions of the notebook that the inventor wants to associate with the invention disclosure form.

At box 308, addition invention disclosure form content is added to the invention disclosure form. Such content can be any content outside the notebook that the inventors feel will be helpful in better understanding the invention. Such content may include typed description by an inventor in predefined fields of a template for the invention disclosure form. The content can also include images, such as graphs, screen shots, and the like that the inventors deem to be helpful in allowing a third party to understand the invention better. The content can also include videos, either predefined, or created at the time of filling out the invention disclosure form, such as videos of the invention or of the inventor describing the invention for use by a third party like patent counsel who may be tasked with preparing a patent application for the invention.

At box 310, the inventor invites other users to have access to the invention disclosure form and the relevant portions of the inventor notebook. Such an invitation may occur in a familiar manner, with the inventor selecting names of invitees from a list that has associated with it the email addresses of each invitee. The inventor may also identify a role for each invitee from a predetermined list of possible roles, and the user may define access and editing rights to the content for each such role or invitee user. A messaging system may then send emails to each invitee, where the emails include in their bodies links that bring the recipient back to the management system that has managed the process thus far.

At box 312, the process receives comments on the content from the other users who were invited. Such users may initially credential themselves by providing user IDs and passwords (if they are already registered with the system) and their access level and editing ability may then be tied to their credentialed ID.

At box 314, the inventors provide updates in response to the comments from the other users. For example, as soon as one of the other users left the collaborative workspace, the process could generate a message to the inventor automatically, so that the inventor would know they could immediately review the other user's comments, and adjust the disclosure based on them. Such actions by the inventor may then trigger the sending of a message automatically to a patent attorney (who may have been one of the other users providing comments). Upon receiving such a message that the inventor believes the disclosure materials to be complete, the patent counsel may begin work on a patent application, either in the system itself or in a stand-alone word processing application and drafting application. In doing so, the counsel may access the inventor materials, such as to cut and paste from images posted by the inventor, and to obtain text, test results, or other information from the inventor materials. The counsel may then prepare the application for a patent in an ordinary manner, and may provide it to the system when its is deemed ready for inventor review, at box 316.

At box 318, the system receives updates on the patent applications, such as by edits made by inventors to the application documents. Such updates may continue in a back-and-forth manner, with the inventor providing feedback and the counsel generating new drafts of the application, until the drafts have been completed. At that time, the counsel can use the system to directly upload the documents to the relevant patent office. For example, the process may perform a conversion on any images from their original form to a PDF form, or other form appropriate to the type of content in a document (e.g., documents that contain embedded videos may be converted to a universal form that supports the presence of such videos). The process may generally operate as a script by which simulated keystrokes for a computer user are submitted to the patent office and certain confirming steps are provided by the counsel. Using this process them, an inventor may communicate more efficiently and effectively with others in the move from idea to patent filing.

Figure 4:
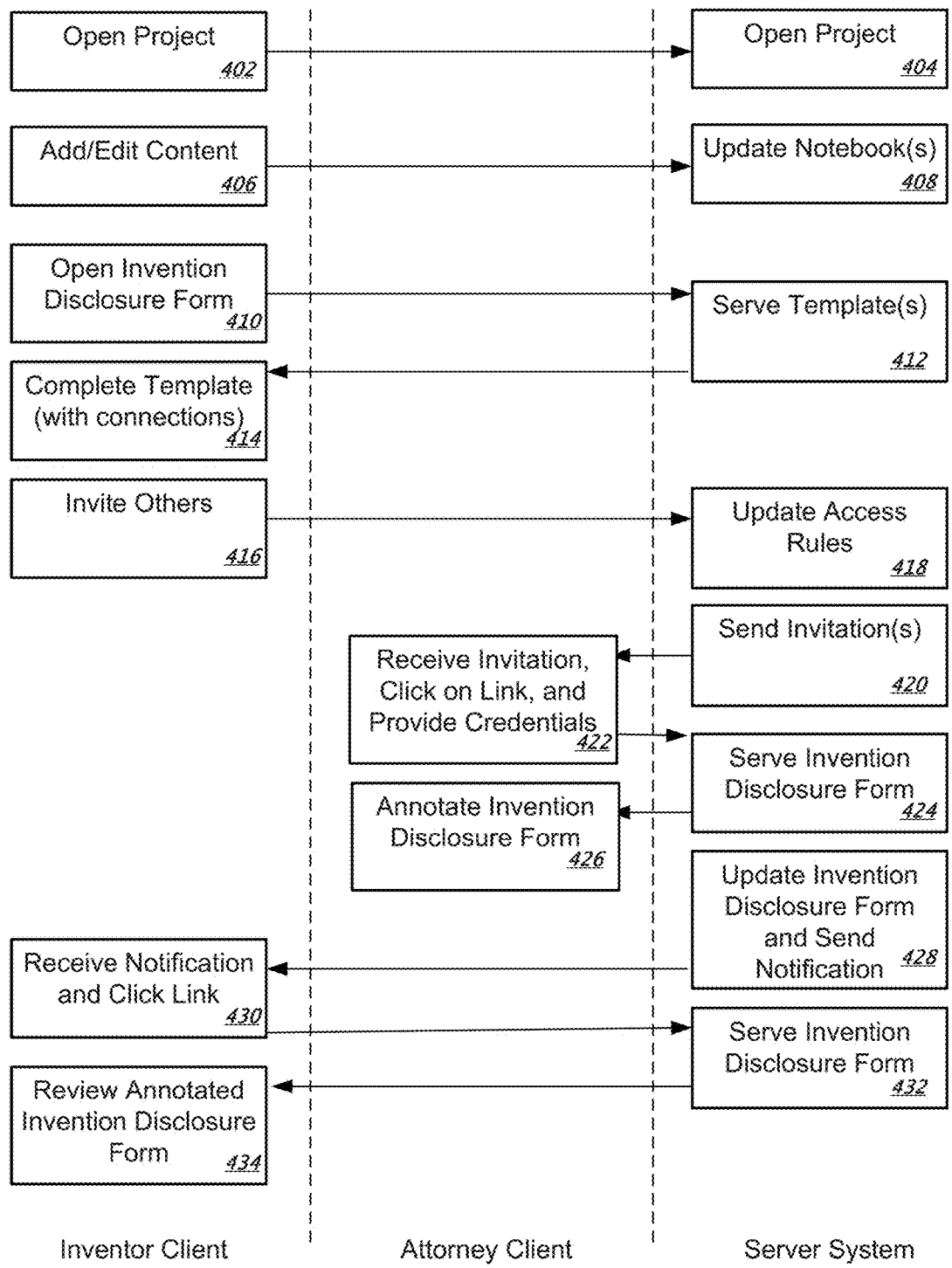
FIG. 4 is a swim lane diagram showing example interactions for sharing of invention-related information.

FIG. 4 is a swim lane diagram showing example interactions for sharing of invention-related information. In general, the process shown here is similar to that shown and discussed in FIG. 3, and can be implemented by a system such as that shown and discussed in FIG. 2. The process here generally describes steps that users of a hosted server system can take to record inventive activity and have that activity reviewed by others.

The example process begins at box 402, where a first user such as a solo inventor opens a project with the hosted server system, and at box 404, the system opens the project. Such action may simply involve providing a name to an open collaboration note-taking and communication space that can be accessed by the inventor from his remote client devices (e.g., mobile computing device such as smartphones and tablet computers). At this stage, the inventor could also invite other inventors to be collaborators on the project, and they could access the collaboration space to communicate with each other in various manners and to record their notes, sketches, and other observations.

At box 406, such content is added to the electronic collaboration space, and the server system updates such content in one or more inventor notebooks for the project at box 408. The particular organization of different inventor notebooks can take various forms. For example, a particular project can be associated with a particular collaboration area for purposes of user access restrictions. That collaboration area may include an electronic notebook that can be divided hierarchically by tabs and sub-tabs (and further sub-pages) to organize the work of an inventor or group of inventors, and they group can change the organization over time as the content and their needs change.

At box 410, the inventor has reached a point at which he is prepared to start thinking about seeking intellectual property protection for one or more inventions that are part of the project. Thus, the inventor access the hosted server system to open an invention disclosure form, and the server system serves a template (e.g., to a browser on the client or a native application on the client) to the user that the user can fill out (box 412). At box 414, the user completes the template, such as by providing an overview of the invention and particular embodiments of the invention. The user may also identify portions of the notebook (e.g., particular tabs or sub-tabs in the hierarchical arrangement of the notebook) and link the invention disclosure form to them. Such linking may serve as an implicit directive that users subsequently given access to the invention disclosure form will also receive access (at least read-only access) to the relevant tabs or sub-tabs in the notebook.

In providing such invention disclosure information to an attorney, the inventor may disclose a variety of data. In addition to describing a problem solved by the invention, describing the invention in general, and describing particular embodiments of the invention, the inventor can provide additional notes, such as by identifying commercial areas and implementations into which the inventor expects the invention to be particularly useful, and identifying sub-ideas that would be useful to include in particular patent claims.

At box 416, when the inventor has completed the invention disclosure form, he may invite others to access the form—e.g., his co-inventors to check and complete or correct his work, and businesspeople and legal counsel to review the form to determine whether the invention should proceed further in a process for determining whether to obtain patent protection on the invention. At box 418, the server system receives identifiers for the invited users (e.g., email addresses) and updates its access rules for the invention disclosure form so that the invited users will have access. At box 420, the server system sends invitations to the identified users, and at box 422, the particular second user here (who may be patent counsel) receives an invitation, clicks on a link that may be embedded in the invitation, and is asked to provide credentials to the server system. The link may also contain an identifier for the particular invention disclosure form, so that the system may know which invitation the user is responding to.

At box 424, if the user provides proper credentials and has been invited, the server system serves the invention disclosure form to the user. The form may be provided in a read-only-but-annotate mode, so that the user cannot change the content of the form, but can add annotations to the form that can then be viewed by others, such as by the inventors. For example, a patent attorney may annotate portions of the form with questions where the attorney is confused about the details of the invention, or may identify additional data that the inventors need to provide before the invention will be ready for patenting.

At box 428, the server system receives the annotations and updates the invention disclosure form with them. In certain instances, the inventor may use a native application to interact with the server system, as the inventor may use the system more often and prefer the convenience of a native application, while other more casual users may interact with the server system via web-based interfaces through browsers on their client devices, because they do not want to go to the trouble of installing an application if they do not use the system much.

The server system, as part of a predefined workflow management scheme, may also send a notification to the inventor, such as via an email with an embedded link to the invention disclosure form, to inform the inventor that the attorney has made comments to the form. The communication may also identify which other user made the comments, so that the inventor may determine whether he wants to jump immediately to the form and review the comments (box 430). If he does, he can also immediately address the comments upon the server system serving the annotated invention disclosure form to him (boxes 432 and 434), and when he is through, the system may send a similar notification to the attorney. The attorney may then "sign off" on the form, which may cause it to be sent to counsel for drafting or if the attorney is the drafting counsel, may cause the inventor to be notified that a draft is coming shortly, and also add a docket entry to the attorney's application preparation docket automatically.

In this manner, then, an intuitive workflow may be managed between users of a server system such as system 202 in FIG. 2. Inventors may be provided with tools they need (e.g., capturing of video and sketches, among other things) to record their ideas, and others they work with can have access at appropriate levels (e.g., based on their working roles) to such information to assist the inventors in evaluating and protecting their ideas. Each such user can readily access the content and be updated when there is something new to review, because the system 202 can be made accessible to all forms of devices using both browser-based and native application-based access methods.

Figure 5B:
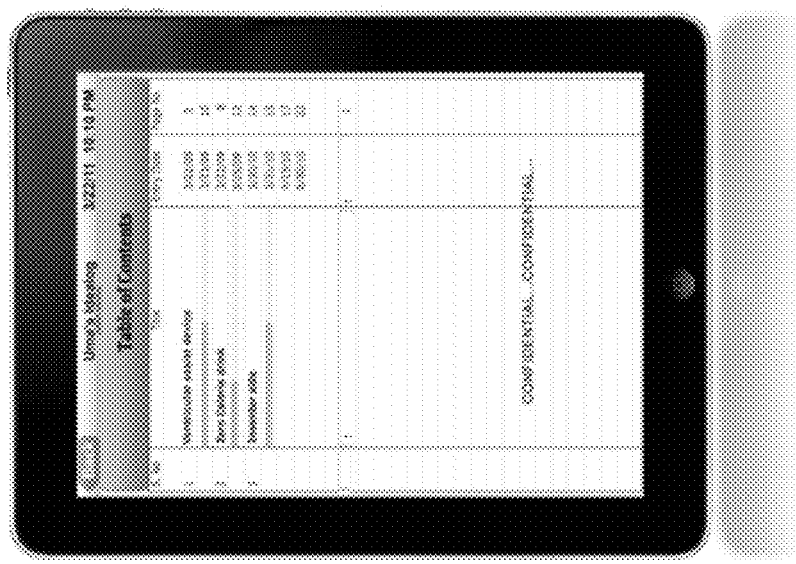
FIGS. 5A-5I are example screen shots from a system that provides tracking of information about inventive activity.
Figure 5A:
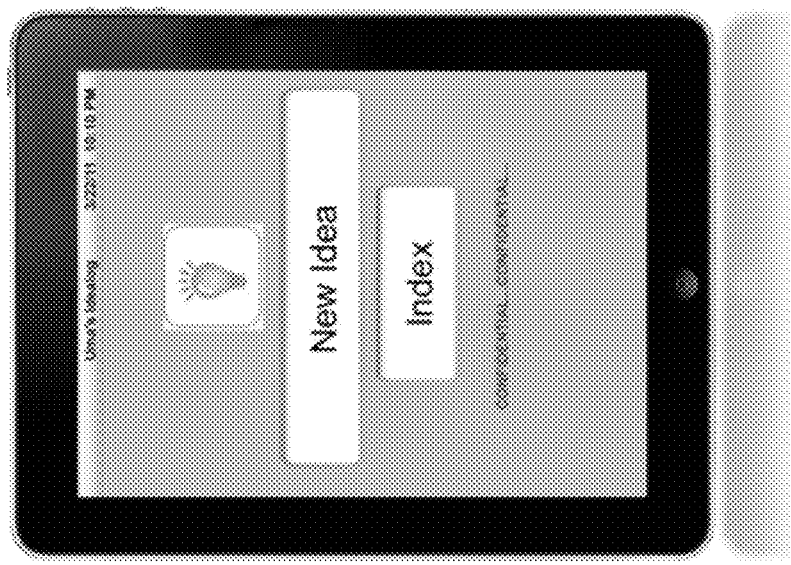

FIGS. 5A-5G are example screen shots from a system that provides tracking of information about inventive activity. Specifically, FIG. 5A shows a display for a cover page of an invention notebook, as displayed on a tablet computer. The title bar across the top of the display indicates that the overall notebook belongs to an inventor named Uma, while the title "New Idea" shows a particular invention to which a portion of the notebook is addressed. The index, though not shown in detail here, may show the pages within the "New Idea" notebook at which discrete parts of the entries appear, and may be hyperlinked so that the user may simply touch one of the index entries and be automatically jumped to that entry.

FIG. 5B shows a table of contents for an invention notebook. In this example, there are three separate inventions, and fuel gauges indicate the degree to which an inventor has fully developed the documentation needed to prepare a patent application. The fuel gauges may be computed based on the inventor identifying that certain milestones have been met, and a message to a patent counsel may be generated automatically whenever a fuel gauge for a particular matter exceeds a predetermined level. As a result, the reviewing party may immediately look to the inventor's progress and provide quick feedback to steer the inventor in the proper direction. The right-hand columns indicate particular entries for each such invention, and the date on which the entries were last edited, along with the page in the overall notebook on which such entries are located.

Figure 5D:
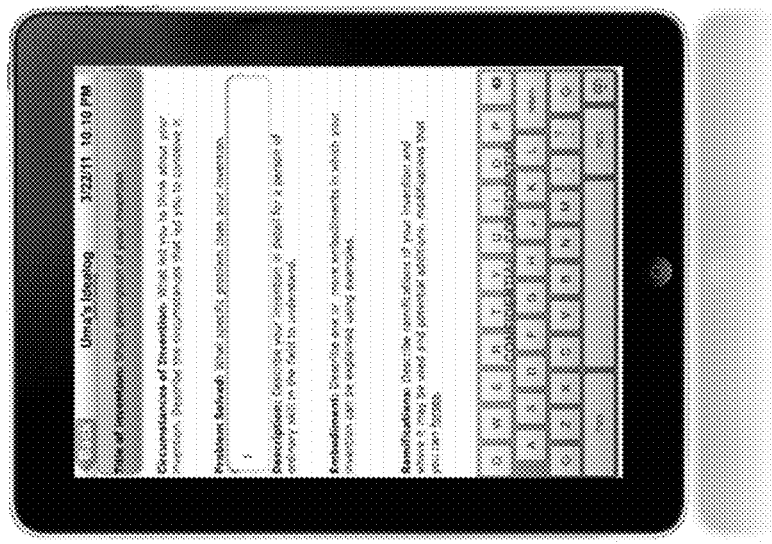
Figure 5C:
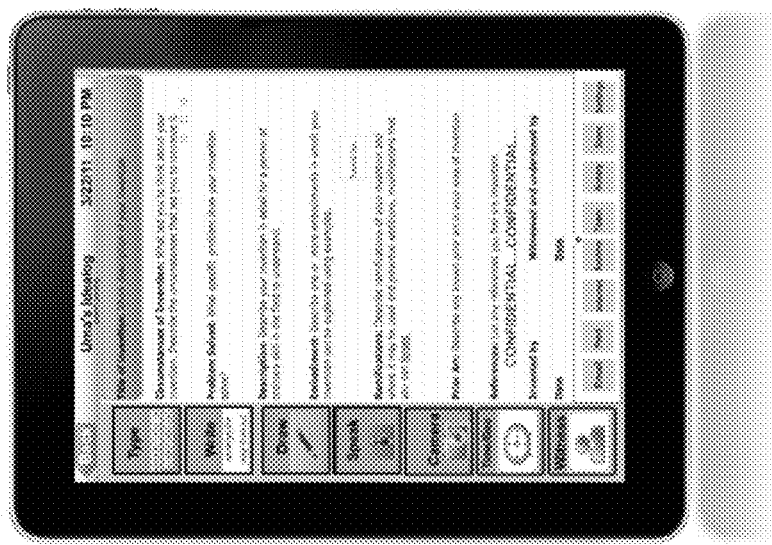

FIG. 5C shows an example display for an invention disclosure form. In a main canvas of the invention disclosure form, the form has been populated with text from a predefined template. The template includes textual instructions to an inventor in filling out the form, and spacing into which the inventor may type answers to the questions and also attach relevant connections to other content sources. In this example, a user can select input modes by pressing icons along a left edge of the display, where the input can be in the form of typed text (for which a virtual keyboard will appear on the screen), handwritten or scanned text (which may be converted to ordinary text form by optical character recognition and stored in conjunction with the image from which the text was identified), drawings, audio recordings, images captured with the tablet, and input for a time stamp and a witness to confirm the existence of certain content in the notebook. Along the bottom are icons defining actions that the user can take with the content of the invention disclosure form, such as sending it in a message to someone, printing it, posting it to an internet-accessible location, archiving it, sending a link to it to a predefined group of team members (e.g., all users who were previously invited), sending it to a notary for notarizing (where the application may maintain a list of notaries who have videoconferencing connections for performing remote notarizing), a store for purchasing electronic items, and a screen for changing settings for the application (where the application shown here is in the form of a native application running on the tablet).

Portions of prior art or other references may also be fully imported to a notebook or invention disclosure form, in addition to being linked from such documents. For example, an inventor may import a PDF file or a portion of various formats of files, and may then annotate the imported content, such as to explain what is relevant about the content, and why the content is different than their invention. Similarly, the system may import other document formats, including emails, electronic faxes, scans, text messages, and CAD diagrams, and may include APIs for communicating data to and from various laboratory instruments.

Moreover, audio input in various forms (e.g., MP4 files, avi files, and the like) such as audio captured via a tablet computing device, can be stored and can be transcribed by the system 202, including by speech-to-text converters on the server system. The audio from such files may be saved, and may be coordinated with a transcript. Also, where an audio, video, or audio/video file has been recorded by a user, the system may be programmed to automatically provide notice to another user who can transcribe the audio manually into a textual form (e.g., an administrative assistant to the inventor).

Meetings between patent counsel and inventors may also be scheduled and coordinated through the system 202, so that audio and/or video from such conferences can be saved automatically, and speech-to-text conversion may be performed upon such communications automatically or in response to explicit request by a user. As a result, transcripts can be coordinated to the discussions and users may jump to portions of the audio by clicking on corresponding text in the transcripts. Such a feature may improve the efficiency of patent counsel in reviewing materials relating to an invention, and in preparing patent applications. Moreover, server-side conversion may be more accurate than client-side conversion, given the additional computing resources available on the server side.

Printed output for a defined project may be provided in a manner that integrates content from more than one document source (e.g., from a team inventor's notebook and from an invention disclosure form) and formatted in a manner that makes review of all the inventive content easier. For example, the content from an invention disclosure form may be interspersed visually with linked content, such as figures and text in a notebook that is linked from the invention disclosure form. Also, such output may be provided in paper or other form to permit secure archiving that can be used to establish, consistent with legal standards, a date of creation for such documents.

Such a documenting approach may thus pull together content from multiple sources, where some of the sources would not otherwise provide date-verifiable information (i.e., the ability to determine the date on which certain content was added, with different dates for different content in a particular file), and where the aggregated information may be both easier to review and understand, and date-verified (i.e., where either the content as a whole can be date-verified, and in some implementations, sub-sets of the content can have different date-verified dates in which the content is identified as having been created or added to the project). Such a system may then permit an organization to prove a date of its invention for wider ideas, and particular sub-ideas, whether to prove an invention date for its own intellectual property assertions, or to establish a prior conception date defensively so as to ward off charges of infringement from another organization.

Moreover, a system, such as system 200 in FIG. 2, may permit searching across one or more projects for an organization, whether using Boolean searching, natural language searching, or other appropriate form (including searching on content in a project and on meta-data for the content, such as topical tags that describe the categories and sub-categories for each invention and related project). In this manner, if an organization receives an invention disclosure form on a particular topic, it can search tags for that topic name and be presented with a list of other invention disclosure forms and filed applications that also are tagged with the same topic. Full-text searching can be used in combination with meta-data searching, or separately also.

In addition, by providing such a variety of input mechanisms (e.g., typing, handwriting, drawing via touchscreen, video and audio recording, etc.), such a system can capture ideas from inventors in a form that is most natural to any particular inventor. As a result, the inventor can more efficiently and effectively communicate his or her ideas to teammates, to businesspeople, and to legal counsel. In addition, the inventor may be able to capture more ideas or more complete detail on ideas (especially before the idea flies away)—e.g., if the inventor is a slow typist and is able to use the system to video record his complete thoughts on a new idea (e.g., by leaving a tablet computer next to his bed-side for late night innovations).

A "store" button in the figure also provides a mechanism by which a user can purchase products or services related to idea generation and patent applications. The purchased items may be in the form of physical products or services, such as consulting service provided to inventors. For example, an inventor may purchase additional notebooks or project collaboration spaces, or may choose to upgrade features from the system. In addition, the user can purchase e-books and other inventor-directed content such as CAD software and the like. For services, the system may provide a directory of consultants to inventors, where the directory shows ratings and comments on the consultants from other inventors who have hired them, and an inventor may be connected to a selected consultant to discuss the consultant doing work on a project for an inventor.

FIG. 5D shows more clearly certain sections of the invention disclosure form. An inventor may add typed text or other content in each section. For example, under the "circumstances of invention," the inventor may describe the situation he faced when he conceived the invention. Under "problem solved," the inventor may describe the technical or other problem that his invention solves or at least mitigates, Under "description," the inventor can describe the invention to the level of detail that is possible. Under "embodiment," the inventor may describe particular implementations of the general inventive idea, and under "ramifications," the inventor may describe the effect that the invention may have on users of the invention or others, including by describing particular benefits (e.g., technical or financial benefits) that the invention may bring in certain embodiments.

Figure 5F:
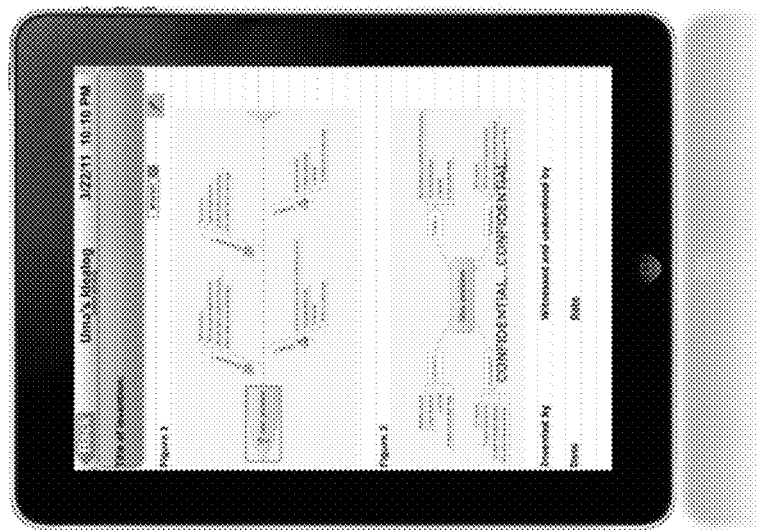
Figure 5E:
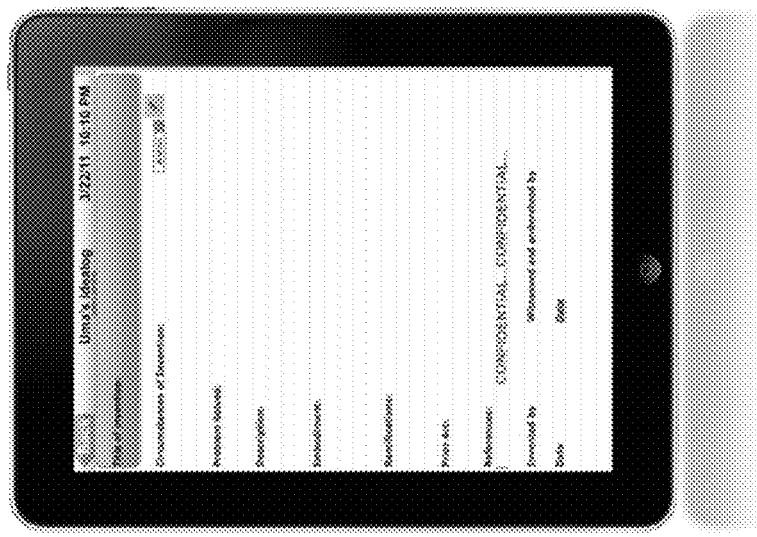

FIG. 5E more completely shows the invention disclosure form, and also includes fields in which the inventor may identify prior art of which he might be aware, and any external references that may be helpful in understanding the invention, such as links to descriptions of the background technology. Also, the inventor name may be provided, as may a witness signature in a familiar manner.

A system may be provided with functionality to remind an inventor to have particular content witnessed, and may periodically check to determine if the content has been witnessed. For example, a system may allow an inventor to rate ideas from 1 to 10 when the ideas are developed, and can generate witnessing reminders for any idea that exceeds a 5 or other predetermined value. Other reminders may also be generated, such as reminders for an inventor to sign formal papers (which the system may determine have been communicated to the inventor, such as through an e-mail that was enabled by the system) or review other content.

FIG. 5F shows figures that the inventor may provide with respect to an invention. The title of the invention provided on other pages may be continued on this page in certain embodiments, so as to provide a continuing visual cue for the user to understand what information they are reviewing. In this example, the inventor has chosen to use a fishbone diagram and a simple block diagram to help illustrate the invention. The system may be stocked with template figures like those shown here, and the inventor may select from and customize such figures for inclusion in the invention disclosure form.

Figure 5H:
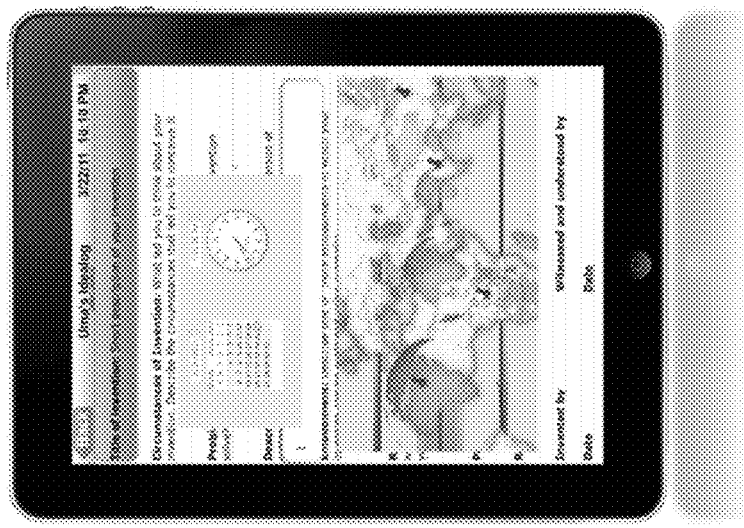
Figure 5G:

FIG. 5G shows inclusion in the invention disclosure form of video content. While an inventor may record audio and/or video of himself using a camera and microphone in the tablet, in this example, the inventor has also opened a teleconference with another user, such as with a co-inventor, and is recording a conversation that the two are having. Such conversation may be an attempt to briefly summarize the invention for others who ill later be invited to review the invention disclosure form. Alternatively, the display shown here may represent communications between an inventor and a witness or notary, whereby the two may communicate before the witness/notary provides a signature (e.g., so that the inventor may clear up technical confusion from a witness, or may properly identify himself to a notary).

FIG. 5H shows a time and geo stamping function of the native applications. In particular, such stamps may be applied automatically, or a user may call manually for the application of such stamps. The calendar and clock show the current time, while the world map displays a pin at the user's current geographic location, and also displays other pins at other geographic locations at which the inventor or other co-inventors (using pins of differing colors) were located when they added content to an inventor notebook or the invention disclosure form.

Figure 5I:
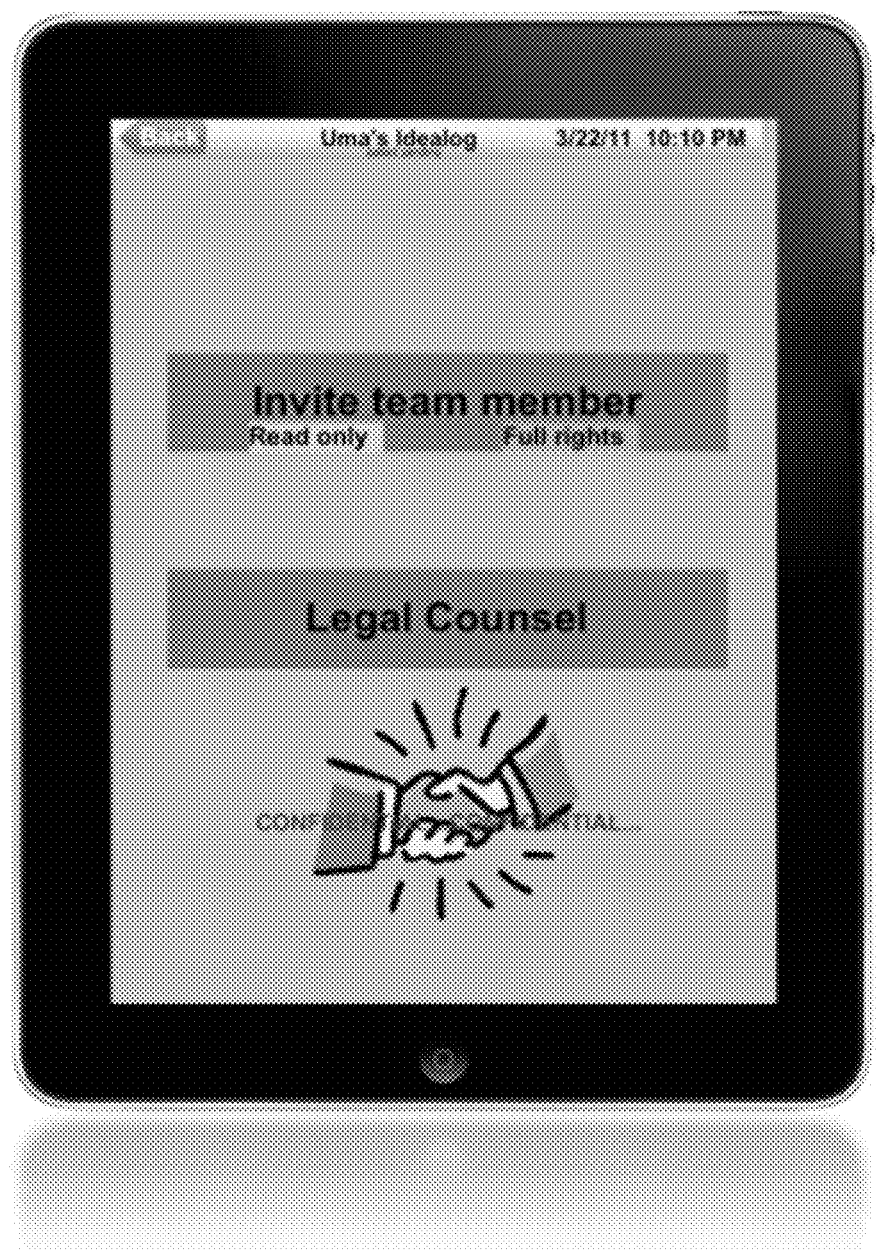

FIG. 5I shows an invitation screen that the inventor may use to invite various team members to review the content in the invention disclosure form, and also any content that is pointed to by the invention disclosure form, such as content in an inventor notebook. As can be seen, the access to any particular invitee may be selected by the inventor (or other "owner" of the collaboration space for the particular invention) in the process of inviting them to the space. Also, a patent attorney can be selected to visit the space. In certain circumstances, the identity of the attorney may be pre-defined, such as when the inventor has worked with a particular attorney before, or where the system has been provided by a particular patent firm. In other situations, the native application and related system may maintain a list of referral attorneys, and may select from members of the list based on the technology in the particular invention, and perhaps also on the geographic location of the inventors (though geographic location may have lesser force if the inventors and attorney both have access to advanced communication devices and the collaboration space shown here).

Figure 6:
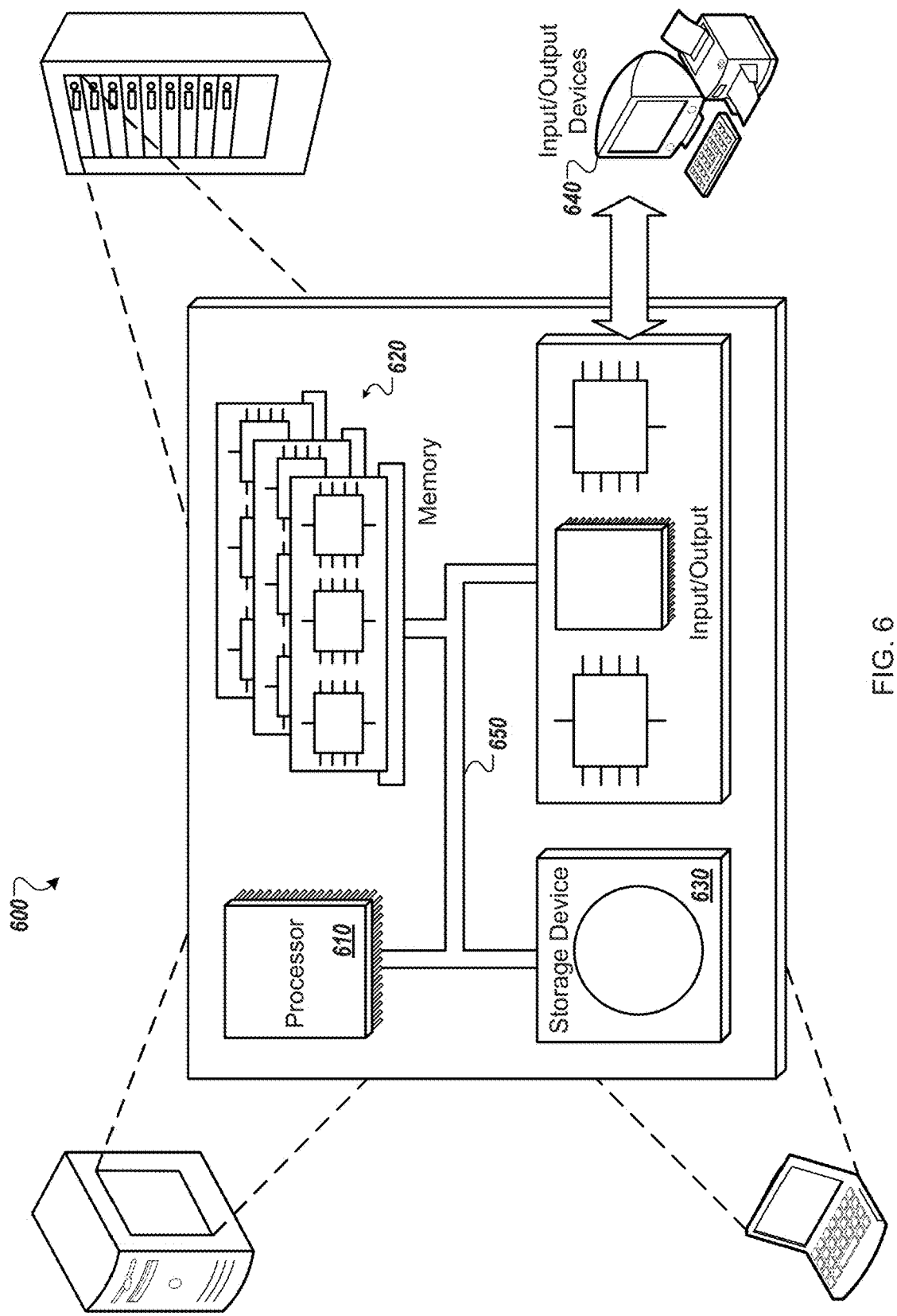
FIG. 6 shows an example of a computer device and a mobile computer device that can be used to implement the techniques described here.

FIG. 6 is a schematic diagram of a computer system 600. The system 600 can be used for the operations described in association with any of the computer-implement methods described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method, comprising:
   receiving, from a device associated with a user of a hosted computer system, entries in a template of an electronic invention disclosure form that summarizes an invention made by one or more inventors;

linking the invention disclosure form to multiple discontinuous portions of an inventor's notebook that is separate from the invention disclosure form and contains descriptions of development of the invention that were made before the electronic invention disclosure form was completed, wherein the portions of the inventor's notebook that are linked to by the invention disclosure form contain detail for concepts that are summarized in the invention disclosure form and portions of the summarized concepts in the invention disclosure form are selectable by a user to be shown the corresponding portions of the inventor's notebook;

providing invitations to a collaboration space for the invention, whereby acceptance of the invitation provides access to at least a portion of the invention disclosure form; and providing secure access to invitees into the collaboration space, wherein the invitees are determined to have been invited to the particular collaboration space before being given access to the particular collaboration space.

2. The computer-implemented method of claim 1, wherein the template includes questions about problems solved by the invention and process for developing the invention, and the entries comprises answers to the questions.

3. The computer-implemented method of claim 1, wherein the received entries identify pointers to content about the invention, wherein the content is located outside the invention disclosure form.

4. The computer-implemented method of claim 1, wherein linking the invention disclosure form to at least one portion of the inventor's notebook comprises storing, with the hosted computer system, a uniform resource indicator that is associated with the invention disclosure form and points to the multiple discontinuous portions of the inventor's notebook.

5. The computer-implemented method of claim 1, further comprising controlling user access to content from the invention disclosure form or the inventor's notebook to users who have been previously identified by a user identified by the system as an owner of the invention disclosure form.

6. The computer-implemented method of claim 5, wherein controlling user access comprises identifying a working role of a user attempting to access content, and using the identified role to determine an ability of the user to access the content.

7. The computer-implemented method of claim 1, wherein the entries include data selected from two or more categories consisting of digital video, digital audio, digital audio/video, digital images, electronic drawings, and text.

8. The computer-implemented method of claim 1, further comprising time-stamping content in the inventor's notebook to indicate when the content was provided to the inventor's notebook, the inventor's notebook having multiple different time stamps for different sub-sets of content in the inventor's notebook.

9. The computer-implemented method of claim 1, wherein the inventor's notebook is associated with a defined project having a common developmental focus, and the hosted computer system stores other separate inventor's notebooks associated with other defined projects that have other developmental focuses.

10. The computer-implemented system of claim 1, wherein the hosted computer system associates a plurality of separate invention disclosure forms with a particular inventor's notebook that is accessible by multiple inventors and that contains content from portions of inventor's notebooks that are not accessible to each of the multiple inventors.

11. The computer-implemented method of claim 1, further comprising identifying potential inventors based on content provided in the inventor's notebook, users who have access to the inventor's notebook, or both.

12. A computer-implemented method comprising,
receiving, from a device associated with a user of a hosted computer system, entries in a template of an electronic invention disclosure form;

linking the invention disclosure form to at least one portion of an inventor's notebook containing disclosure of an invention addressed by the invention disclosure form;

providing invitations to a collaboration space for the invention, whereby acceptance of the invitation provides access to at least a portion of the invention disclosure form; and providing secure access to invitees into the collaboration space, wherein the invitees are determined to have been invited to the particular collaboration space; and geo-stamping content in the inventor's notebook to indicate where geographically the content was provided to the inventor's notebook, the inventor's notebook having multiple different geo-stamps for different sub-sets of content in the inventor's notebook.

13. A computer-implemented system, comprising:
one or more computer processors; and
one or more devices connected to the one or more computer processors and having tangible, non-transitory computer-readable media storing instructions that when executed by the one or more processors, cause the one or more computer processors to perform operations comprising:

receiving, from a device associated with a user of a hosted computer system, entries in a template of an electronic invention disclosure form that summarizes an invention made by one or more inventors;

linking the invention disclosure form to multiple discontinuous portions of an inventor's notebook that is separate from the invention disclosure form and contains descriptions of development of the invention that were made before the electronic invention disclosure form was completed, wherein the portions of the inventor's notebook that are linked to by the invention disclosure form contain detail for concepts that are summarized in the invention disclosure form and portions of the summarized concepts in the invention disclosure form are selectable by a user to be shown the corresponding portions of the inventor's notebook;

providing invitations to a collaboration space for the invention, whereby acceptance of the invitation provides access to at least a portion of the invention disclosure form; and providing secure access to invitees into the collaboration space, wherein the invitees are determined to have been invited to the particular collaboration space before being given access to the particular collaboration space.

14. The computer-implemented system of claim 13, wherein the template includes questions about content for the invention, and the entries comprises answers to the questions.

15. The computer-implemented system of claim 13, wherein the received entries identify pointers to content about the invention, the content located outside the invention disclosure form.

16. The computer-implemented system of claim 13, wherein links from the invention disclosure form to at least one portion of the inventor's notebook comprise one or more uniform resource indicators that are stored and are associated with the invention disclosure form, and that point to the multiple discontinuous portions of the inventor's notebook.

17. The computer-implemented system of claim 13, wherein operations further comprise controlling user access to content from the invention disclosure form or the inventor's notebook to users who have been identified by an owner of the invention disclosure form.

18. The computer-implemented system of claim 17, wherein controlling user access comprises identifying a working role of a user attempting to access content, and using the identified role to determine an ability of the user to access the content.

19. The computer-implemented system of claim 13, wherein the operations further comprise notifying a second user upon identifying that a first user has performed an action with respect to the a project associated with the invention disclosure form, the action identified as requiring attention by the second user.

\* \* \* \* \*